United States Patent [19]

Bremers et al.

[11] Patent Number: 4,986,300
[45] Date of Patent: Jan. 22, 1991

[54] BONNET NUT WITH IMPROVED SAFETY CHARACTERISTICS

[75] Inventors: Alan D. Bremers; Melvin L. Osgood, both of Marshalltown, Iowa

[73] Assignee: Fisher Controls International, Inc., Clayton, Mo.

[21] Appl. No.: 534,518

[22] Filed: Jun. 6, 1990

[51] Int. Cl.$^5$ .................. H16K 43/00; G01F 25/00
[52] U.S. Cl. .................. 137/315; 220/284; 220/316
[58] Field of Search .............. 137/312, 315; 220/284, 220/285, 316; 222/108

[56] References Cited

U.S. PATENT DOCUMENTS

| | | | |
|---|---|---|---|
| 3,633,787 | 1/1972 | Katz | 220/284 |
| 4,135,638 | 1/1979 | Wandl | 220/284 |
| 4,308,220 | 12/1981 | Tateno | 220/284 |
| 4,337,788 | 7/1982 | Seger | 137/315 |
| 4,444,220 | 4/1984 | Seger | 137/315 |
| 4,926,898 | 5/1990 | Sampey | 137/315 |

Primary Examiner—George Walton
Attorney, Agent, or Firm—Dale A. Kubly; Nicholas A. Camasto; Arnold H. Cole

[57] ABSTRACT

A valve assembly includes a bonnet that is captivated in a valve body stem mount by means of a threaded bonnet nut. A pair of opposed pry holes are formed in the bonnet at a point above the top of the fully seated bonnet nut. Loosening of the bonnet nut enables a bonnet that is stuck in the body stem mount to be pried loose with a pry bar inserted in one or both of the pry holes and levered against the top of the bonnet nut. The bonnet holes also provide a visual indication of movement of the bonnet and whether there is pressure in the valve body.

5 Claims, 2 Drawing Sheets

BONNET NUT WITH IMPROVED SAFETY CHARACTERISTICS

BACKGROUND OF THE INVENTION AND PRIOR ART

This invention relates generally to high pressure valves and particularly to bonnet securing systems for high pressure control valves.

It is common practice to provide a valve body with a removable bonnet that is maintained in a captivated relationship with the valve body stem mount by means of a bonnet nut. The bonnet is generally cylindrical as is the valve body stem mount, and an O-ring or the like provides the seal between the bonnet and stem mount. A shoulder on the bonnet is engaged by a bonnet nut that is threaded on the end of the stem mount. The bonnet nut may be of the hammer lug type, i.e. have a pair of external lugs to facilitate removal and tightening thereof in heavy duty installations.

A problem that often arises, usually after years of field service or service with corrosive medium fluids, is that the bonnet sticks in the stem mount and is not easily removable when the bonnet nut is removed. Should the valve body be inadvertently left under pressure, a dangerous situation may arise, since the stuck bonnet may suddenly be blown loose when the bonnet nut is removed. A prior art solution to the problem of removing a bonnet that is stuck in the stem mount is shown in FIG. 1, where a partial sectional view of a bonnet nut and a valve body is shown. A hammer lug type bonnet nut 10 having a pair of lugs 16 engages a shoulder portion of a bonnet 12 and maintains it in position within a threaded stem mount 18. A cylindrical hole 22 is formed in the side of bonnet nut 10 and is alignable with a cylindrical blind hole 20 (of similar size) formed in the side of bonnet 12. As indicated, a pry bar 24, or similar tool, may be inserted in both holes 22 and 20 to turn bonnet nut 10 and bonnet 12 together to break bonnet 12 loose from stem mount 18. This prior art solution is awkward in that the holes 20 and 22 must be aligned before the pry bar can be used and there is no way to lever the bonnet 12 loose, apart from turning it with bonnet nut 10.

OBJECTS OF THE INVENTION

A principal object of the invention is to provide a novel bonnet and bonnet nut arrangement that permits safe removal of the bonnet.

Another object of the invention is to provide a high pressure valve that includes a bonnet that may be readily and safely pryed loose.

BRIEF DESCRIPTION OF THE DRAWING

These and other objects and advantages of the invention will be apparent upon reading the following description in conjunction with the drawings, in which.

DESCRIPTION OF THE PREFERRED EMBODIMENT

Figure 2:
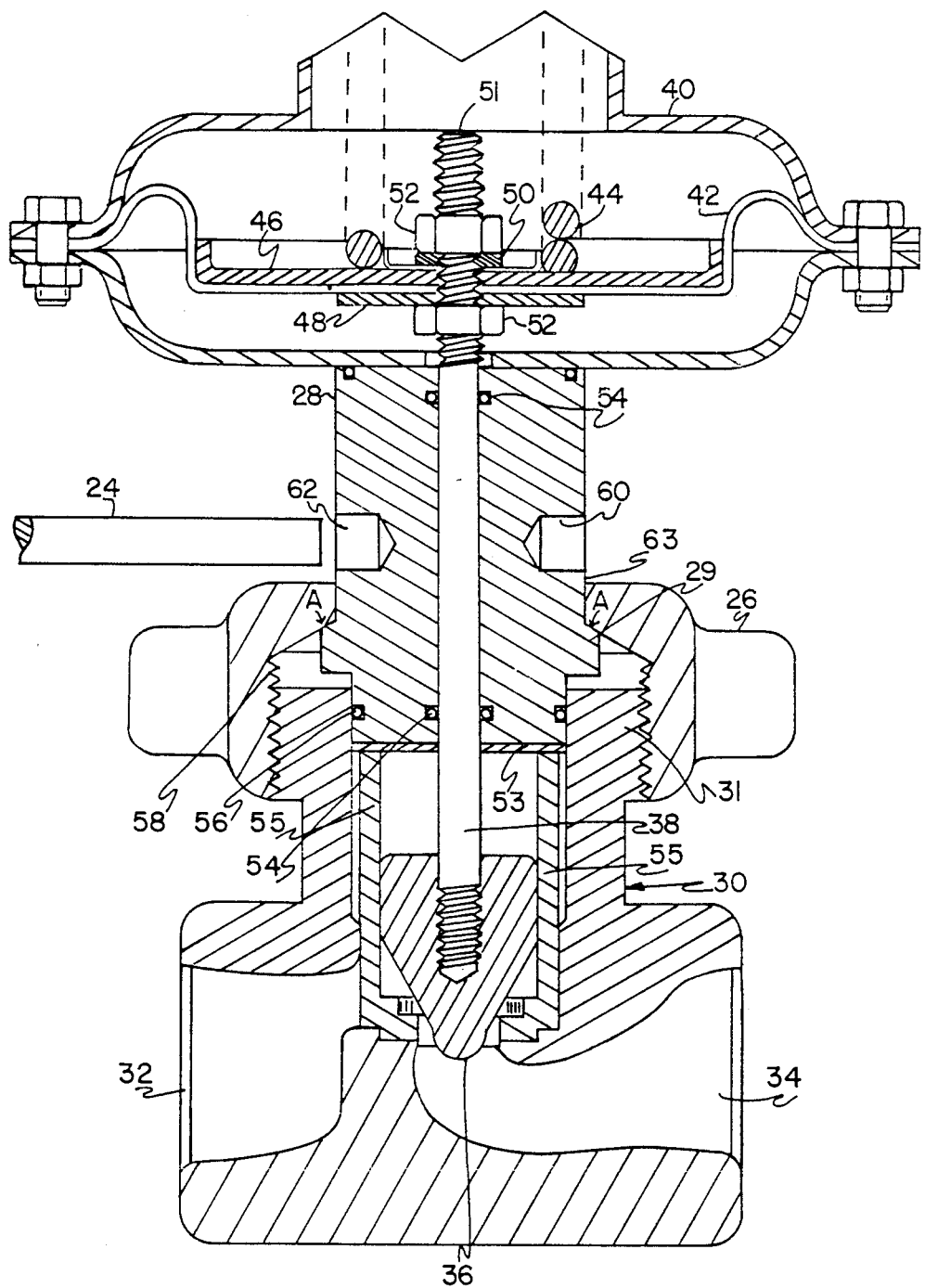
FIG. 2 is a partial view of a high pressure valve incorporating the novel bonnet and bonnet nut assembly of the invention.

Referring to FIG. 2, a high pressure control valve has a valve body 30 with inlet and outlet ports 32 and 34, respectively. The illustration is for a generally cylindrically shaped bonnet 28 and a bonnet nut 26 in fully assembled condition. A vertically movable valve plug 36 is threadingly attached to a valve stem 38. Valve stem 38 passes through an orifice in valve bonnet 28, the interior of which may be equipped with O-ring seals 54 or other well known type of packing. A pair of jam nuts 52 cooperate with washers 48 and 50 and a threaded end 51 on stem 38 to captivate a diaphragm 42 and a slightly disked diaphragm plate 46 therebetween. Diaphragm 42 is conventionally supported in a diaphragm housing 40 and is loaded by a control spring 44. It will be appreciated that the control portion of the valve as well as the valve itself are conventional and may comprise any well known construction, the present invention being specifically directed to the bonnet, the bonnet nut and the bonnet removal means. A pair of diametrically opposed blind holes 60 and 62 in bonnet 28 are located such that a distance 63 is provided between the top of bonnet nut 26 and the holes 60 and 62. An O-ring 56 in a suitable annular groove in cylindrical bonnet 28 seals bonnet 28 to the stem mount 31 of valve body 30. The stem mount 31 of valve body 30 is threaded for engagement with a matching internal thread 58 in bonnet nut 26. The tapered surfaces between the inside of bonnet nut 26 and a shoulder 29 on the bonnet 28, indicated at A, helps to align the bonnet 28 in stem mount 31. A washer 53 and a cage 55 are forced by tightening movement of bonnet nut 26 against the bottom of valve body 30 to secure the bonnet in the valve body. Valve plug 36 is movable in cage 55 for controlling flow between inlet and outlet ports 32 and 34. This construction is well known and has no bearing on the invention. A pry bar 24 or other suitable tool may be inserted in either of holes 60 or 62 and levered against the top of a loosened bonnet nut 26 to free a stuck bonnet.

Figure 1:
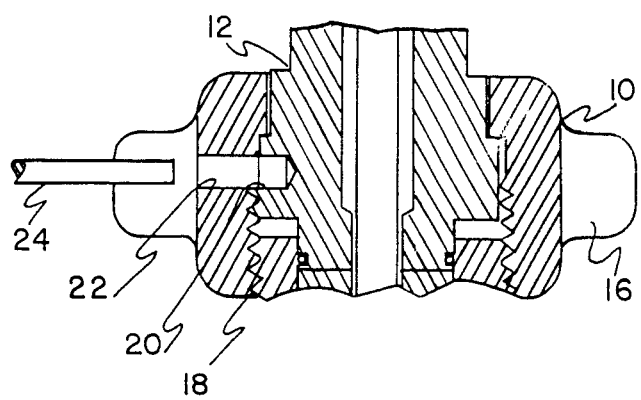
FIG. 1 is a partial sectional view of a prior art bonnet and bonnet nut assembly.
Figure 3:
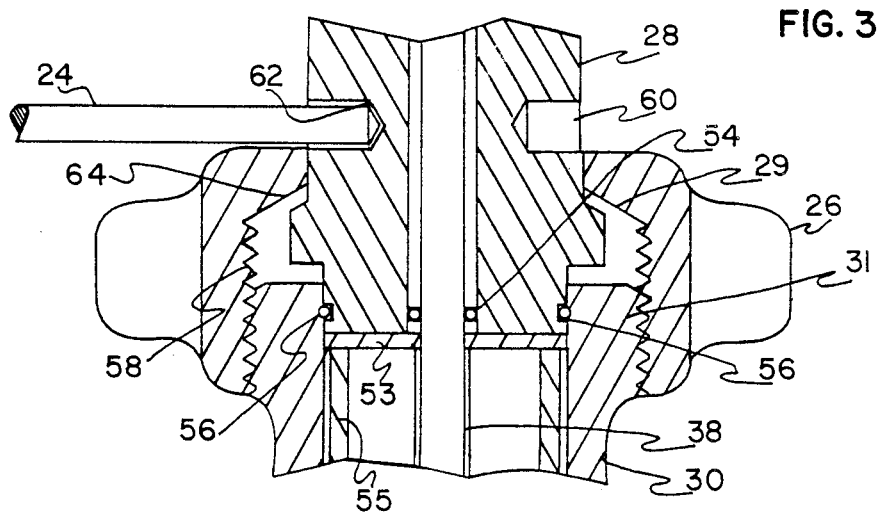
FIG. 3 is a sectional view of a portion of the valve of FIG. 2 illustrating removal of a stuck bonnet.

In FIG. 3, the bonnet nut is shown partially loosened with the bonnet 28 being stuck in stem mount 31. In this condition, the seal with O-ring 56 is still intact, although a gap 64 exists between the underside of the bonnet nut 26 and the tapered portion on the upper side of shoulder 29 of bonnet 28. In this condition, it is not known whether the valve body is under pressure and the operator is at risk in continuing removal of the bonnet nut. A pry bar 24 is installed in hole 62 and may be used to lever the bonnet 28 vertically upward with respect to stem mount 31 by applying downward pressure against the top of bonnet nut 26. This breaks the bonnet loose in the stem mount. If the valve body is under pressure, the bonnet will be driven against bonnet nut 26, but will still be securely retained in the valve stem. Removal of the bonnet nut to the point where the O-ring seal 56 clears the top of stem mount 31 breaks the seal. Should the valve body 30 be under pressure, an audible hiss will be perceived by the operator, warning of the pressure condition.

It will also be appreciated that a visual observation of the distance between holes 60 and 62 and the top surface of bonnet nut 26 readily reveals that the bonnet is stuck in the body since the distance 63 (FIG. 2) has become smaller as the bonnet nut is loosened. If the distance 63 remains the same as the bonnet nut 26 is loosened, it clearly indicates movement of bonnet 28 out of stem mount 31 and that the valve body is under pressure. Danger of the bonnet being blown out exists in continuing to remove bonnet nut 26 under a pressure condition. Shortly beyond this point, the operator should also be hearing a hiss from the escaping pressurized fluid. The extra long threaded portion 58 of bonnet nut 26 enables the bonnet nut to maintain sufficient holding strength to permit the bonnet nut 26 to be loosened sufficiently to verify the pressure condition and enable remedial action to be taken.

It is recognized that numerous changes and modifications in the described embodiment of the invention will be apparent to those skilled in the art without departing from its true spirit and scope. The invention is to be limited only as defined in the claims.

What is claimed is:

1. A high pressure valve comprising:
   a body;
   a bonnet;
   seal means for sealing said bonnet to said valve body;
   a bonnet nut for securing said bonnet in said body; and
   means including an aperture in said bonnet above said bonnet nut to permit levering of said bonnet against said bonnet nut by a suitable tool means cooperating with said aperture when said bonnet nut is loosened relative to said body for permitting said bonnet when said bonnet is stuck in said body to be pried loose from said body for easy disassembly of said bonnet from said body.

2. The valve of claim 1 wherein said bonnet nut and said body are threadingly engaged over a distance sufficient to permit said bonnet nut to be safely loosened to the level of said aperture when said body is under pressure.

3. The valve of claim 2 wherein said bonnet nut comprises a hammer lug type and wherein a pair of opposed apertures are provided in said bonnet.

4. A high pressure valve assembly comprising:
   a body having a cylindrical stem mount;
   an exterior threaded portion on the end of said cylindrical stem mount;
   a cylindrical bonnet having a seal for sealing engagement with said cylindrical stem mount;
   a bonnet nut securing said bonnet in said cylindrical stem mount by means of an internally threaded portion; and
   a pry hole in said bonnet located above the top surface of said bonnet nut, said pryhole permitting levering of said bonnet against said bonnet nut by a suitable tool means cooperating with said pryhole when said bonnet nut is loosened relative to said body to free said bonnet from said body when said bonnet is tuck in said body.

5. The valve assembly of claim 4 wherein a pair of diametrically opposed pry holes are provided in said bonnet and wherein said internally threaded portion of said bonnet nut extends over a distance sufficient to secure said bonnet to said cylindrical stem mount while permitting said seal to be removed from sealing engagement with said cylindrical stem mount.

* * * * *

UNITED STATES PATENT AND TRADEMARK OFFICE
CERTIFICATE OF CORRECTION

PATENT NO. : 4,986,300

DATED : January 22, 1991

INVENTOR(S) : Alan D. Bremers and Melvin L. Osgood

It is certified that error appears in the above-identified patent and that said Letters Patent is hereby corrected as shown below:

Column 4, line 24, delete "tuck", insert --stuck--.

Signed and Sealed this

Thirtieth Day of June, 1992

*Attest:*

DOUGLAS B. COMER

*Attesting Officer*   Acting Commissioner of Patents and Trademarks